(12) United States Patent
Schunk

(10) Patent No.: US 10,598,376 B2
(45) Date of Patent: Mar. 24, 2020

(54) APPARATUS AND METHOD FOR IMPROVING CAMPFIRE HEAT DISTRIBUTION AND AIRFLOW

(71) Applicant: Lee Alan Schunk, Clare, MI (US)

(72) Inventor: Lee Alan Schunk, Clare, MI (US)

( * ) Notice: Subject to any disclaimer, the term of this patent is extended or adjusted under 35 U.S.C. 154(b) by 219 days.

(21) Appl. No.: 15/449,933

(22) Filed: Mar. 4, 2017

(65) Prior Publication Data

US 2017/0254535 A1    Sep. 7, 2017

Related U.S. Application Data

(60) Provisional application No. 62/303,698, filed on Mar. 4, 2016.

(51) Int. Cl.
| | |
|---|---|
| *F23J 11/08* | (2006.01) |
| *A47J 33/00* | (2006.01) |
| *F23B 60/00* | (2006.01) |
| *F23L 17/16* | (2006.01) |
| *F23L 17/00* | (2006.01) |
| *F23B 90/04* | (2011.01) |
| *F23L 9/02* | (2006.01) |

(52) U.S. Cl.
CPC ............... *F23J 11/08* (2013.01); *A47J 33/00* (2013.01); *F23B 60/00* (2013.01); *F23B 90/04* (2013.01); *F23L 9/02* (2013.01); *F23L 17/005* (2013.01); *F23L 17/16* (2013.01)

(58) Field of Classification Search
CPC ......... F23J 11/08; A47J 33/00; A47J 37/0754; A47J 37/07; A47J 36/2477; F23L 17/005; F23L 17/16; F23B 80/04; F23B 60/00; F28D 9/04

USPC .............. 126/29, 30, 9 B, 15 A, 59 A, 110 A
See application file for complete search history.

(56) References Cited

U.S. PATENT DOCUMENTS

| | | | | |
|---|---|---|---|---|
| 93,782 A | * | 8/1869 | Wing | A47J 37/07 126/7 |
| 165,920 A | * | 7/1875 | Doyle | A47J 37/07 126/7 |

(Continued)

FOREIGN PATENT DOCUMENTS

| | | | | |
|---|---|---|---|---|
| FR | 2557271 A1 | * | 6/1985 | A47J 36/30 |
| RU | 2247292 C2 | * | 2/2005 | |
| WO | WO-2008041910 A1 | * | 4/2008 | B01F 5/20 |

OTHER PUBLICATIONS

"NPL—InnovationQ Plus—IP.com.pdf", Web search, https://iq.ip.com/discover, Jul. 24, 2019.*

*Primary Examiner* — Steven B McAllister
*Assistant Examiner* — Daniel E. Namay
(74) *Attorney, Agent, or Firm* — Robert C. Corbett

(57) ABSTRACT

An apparatus includes a heat exchange member at least partially defining a passageway, and structure defining a first plurality of holes and a second plurality of holes. The first and second pluralities of holes provide fluid communication from the passageway to the exterior of the apparatus, i.e., to the atmosphere. A blower is operatively connected to the heat exchange member and configured to blow air into the passageway. The apparatus is configured such that, when the heat exchange member is sufficiently positioned with respect to a campfire, air exiting the first plurality of holes is directed downward and away from the campfire and air exiting the second plurality of holes has an upward velocity component.

17 Claims, 3 Drawing Sheets

(56) References Cited

U.S. PATENT DOCUMENTS

| | | | | |
|---|---|---|---|---|
| 2,939,773 A * | 6/1960 | Rymer | .................. | A47J 37/079 126/15 R |
| 3,159,119 A * | 12/1964 | Hottenroth | .......... | A47J 37/0754 126/25 B |
| 3,266,478 A * | 8/1966 | Booth | ................ | A47J 37/0754 126/144 |
| 3,828,849 A * | 8/1974 | Corman | ............... | F28D 15/046 165/104.26 |
| 3,868,943 A * | 3/1975 | Hottenroth | .......... | A47J 37/0754 126/25 R |
| 4,171,773 A * | 10/1979 | Preston | .............. | F28D 21/0008 126/110 AA |
| 4,565,184 A * | 1/1986 | Collins | .................... | F23B 1/36 110/110 |
| 5,067,396 A * | 11/1991 | Sorensen | ................ | A47J 27/13 126/9 B |
| 5,176,124 A * | 1/1993 | Wrasse | .............. | A47J 37/0704 126/25 R |
| 5,842,463 A * | 12/1998 | Hall | ........................ | A47J 33/00 126/9 R |
| 5,996,572 A * | 12/1999 | Ilagan | ................ | A47J 37/0786 126/21 A |
| 6,145,500 A * | 11/2000 | Westerlund | .............. | F23B 5/02 126/101 |
| 6,675,794 B1 * | 1/2004 | Yang | .................... | A47J 37/079 126/25 R |
| 8,028,690 B1 | 10/2011 | Lohaus | | |
| 8,297,271 B2 | 10/2012 | Cedar et al. | | |
| 8,327,834 B1 | 12/2012 | Judge et al. | | |
| 8,627,775 B1 * | 1/2014 | Wilson | ..................... | F23L 1/02 110/147 |
| 8,800,542 B1 * | 8/2014 | Kennington | .......... | F24B 15/005 126/15 A |
| 2004/0226495 A1 * | 11/2004 | Gagnon | .................... | F23B 1/36 110/308 |
| 2006/0121399 A1 * | 6/2006 | Mashhour | ................ | F23G 7/08 431/202 |
| 2009/0165772 A1 * | 7/2009 | Hunt | ................... | A47J 36/2477 126/25 R |
| 2010/0008833 A1 * | 1/2010 | Gulener | .................... | B01F 5/20 422/198 |
| 2012/0060819 A1 * | 3/2012 | Hunt | .................... | A47J 36/2477 126/1 R |
| 2013/0112187 A1 * | 5/2013 | Cedar | .................... | F24B 1/182 126/15 A |
| 2014/0026765 A1 * | 1/2014 | Fou | ..................... | A23B 4/0523 99/445 |
| 2015/0285507 A1 * | 10/2015 | Troyer, Jr. | .............. | F24B 1/182 126/30 |
| 2017/0211812 A1 * | 7/2017 | McClean | ................ | F24B 1/26 |

* cited by examiner

APPARATUS AND METHOD FOR IMPROVING CAMPFIRE HEAT DISTRIBUTION AND AIRFLOW

CROSS REFERENCE TO RELATED APPLICATION

This application claims the benefit of U.S. Provisional Application No. 62/303,698 filed Mar. 4, 2016, and which is hereby incorporated by reference in its entirety.

TECHNICAL FIELD

This disclosure relates to convective heat transfer devices.

BACKGROUND OF THE INVENTION

Campfires, i.e., fires built outdoors such as at a camp, picnic, etc., typically use wood as fuel. In the absence of wind, natural convection causes a significant amount of heat from the campfire to be transferred vertically. Wind may cause heated air, along with particulates, i.e., smoke, to travel horizontally primarily in only one direction, with the heated air mixed with the particulates.

SUMMARY OF THE INVENTION

An apparatus includes a heat exchange member at least partially defining a passageway, and structure defining a first plurality of holes and a second plurality of holes. The first and second pluralities of holes provide fluid communication from the passageway to the exterior of the apparatus, i.e., to the atmosphere. A blower is operatively connected to the heat exchange member and configured to blow air into the passageway. The apparatus is configured such that, when the heat exchange member is sufficiently positioned with respect to a campfire, air exiting the first plurality of holes is directed downward and away from the campfire and air exiting the second plurality of holes has an upward velocity component.

Accordingly, the apparatus provides efficient and effective heat distribution from a campfire. The heat exchange member, when placed in heat transfer relationship with the campfire, transfers heat form the campfire to air contained within the passageway. The blower, when operating, pressurizes the passageway and causes air to flow through the passageway and out the first and second plurality of holes. The heated air exiting the first plurality of holes flows horizontally away from the fire, where it can be felt by campers, picnickers, etc. Air exiting the second plurality of holes flows upward, thereby creating a chimney effect to improve combustion and to reduce or eliminate the horizontal movement of smoke toward people near the campfire.

A corresponding method of use is also provided.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
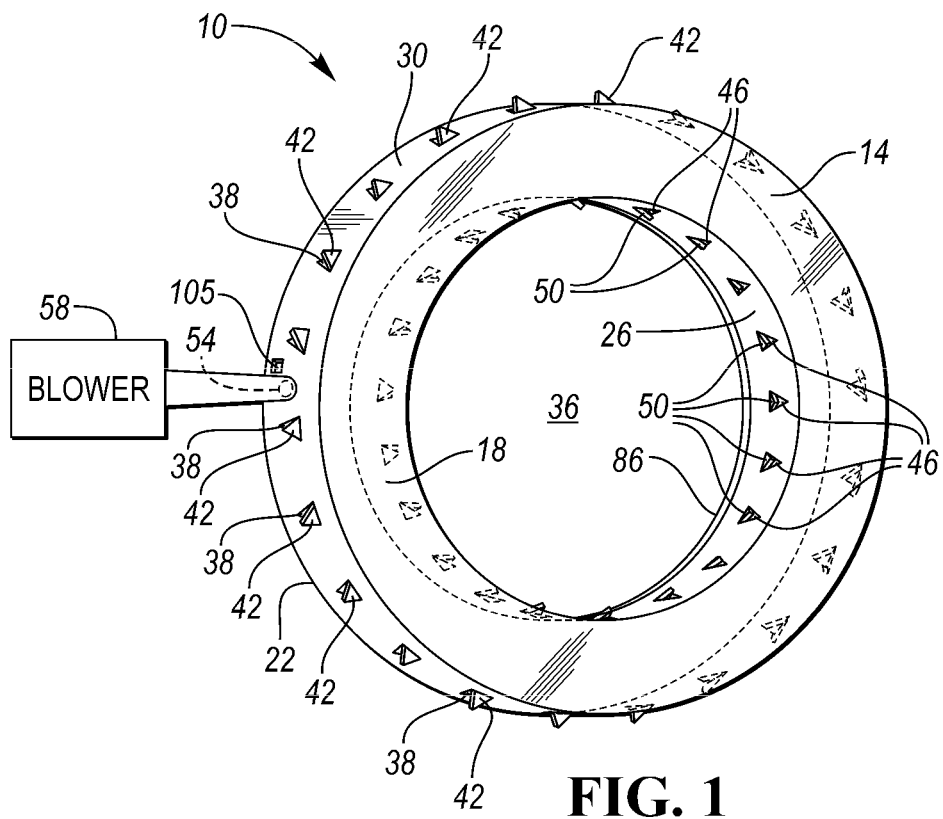
FIG. 1 is a schematic, perspective view of a heat distribution and airflow apparatus, including an annular heat transfer member.
Figure 2:
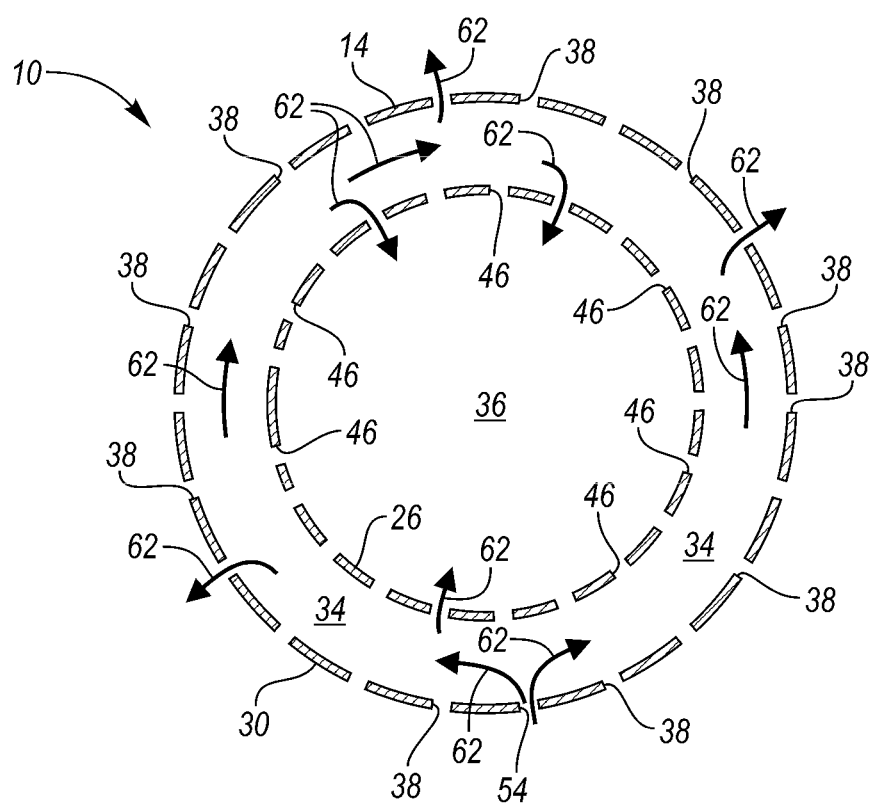
FIG. 2 is a schematic, cross-sectional, top view of the annular heat transfer member of FIG. 1.

Referring to FIGS. 1 and 2, an apparatus 10 is schematically depicted. The apparatus 10 includes a heat exchange member 14. In one embodiment, the heat exchange member 14 forms at least a portion of an annulus, and in the embodiment depicted in FIGS. 1 and 2, the heat exchange member is annular, i.e., forms a complete annulus.

More specifically, the heat exchange member 14 of FIGS. 1 and 2 includes an upper wall portion 18, a lower wall portion 22, an inner wall portion 26, and an outer wall portion 30. The upper and lower wall portions 18, 22 are spaced apart from, and generally parallel to, one another. The inner and outer wall portions 26, 30 are spaced apart from, and concentric with, one another. The inner, outer, upper, and lower wall portions 18, 22, 26, 30 cooperate to define an annular (i.e., ring-shaped) passageway 34. Inner wall portion 26 defines a circular hole 36.

The outer wall portion 30 defines a plurality of holes 38 that provide fluid communication between the passageway 34 and the exterior of the annular heat exchange member 14. Each hole 38 in the embodiment depicted has a respective tab 42 associated therewith. More specifically, each tab 42 is adjacent a respective one of the holes 38. The inner wall portion 26 defines a plurality of holes 46 that provide fluid communication from the passageway 34 to the exterior of the annular heat exchange member 14. Each hole 46 in the embodiment depicted has a respective tab 50 associated therewith. More specifically, each tab 50 is adjacent a respective one of the holes 46. Tabs 42 and 50 are omitted from FIG. 2 for clarity.

In one embodiment, holes 38 are evenly spaced along the circumference of the annular heat exchange member 14 and annular heat exchange member 14 defines eight or more holes 38. Similarly, eight or more holes 46 may be evenly spaced along the circumference of the hole 36 defined by inner wall portion 26.

The annular heat exchange member 14 also defines hole 54, which is also in fluid communication with the passageway 34. The apparatus 10 includes an electric fan or blower 58 that is operatively connected to the annular heat exchange member 14 such that when the electric fan or blower 58 is operating the fan or blower 58 forces air 62 into the passageway 34 through hole 54.

Figure 3:
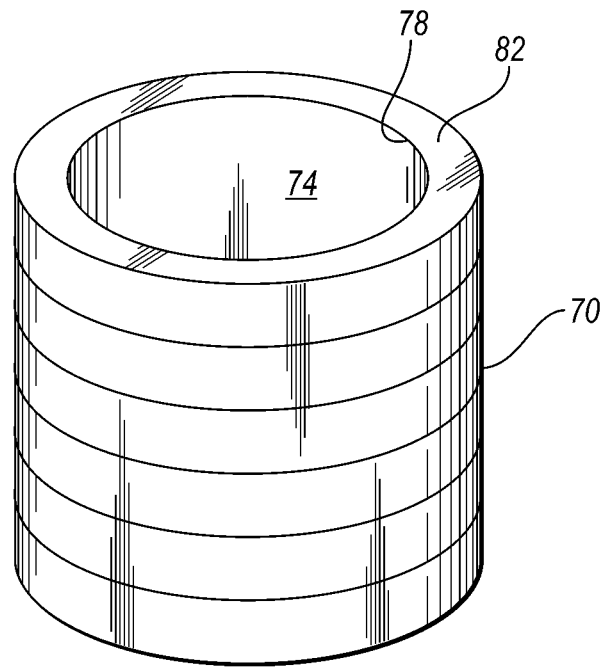
FIG. 3 is a schematic, perspective view of a fire ring.
Figure 4:
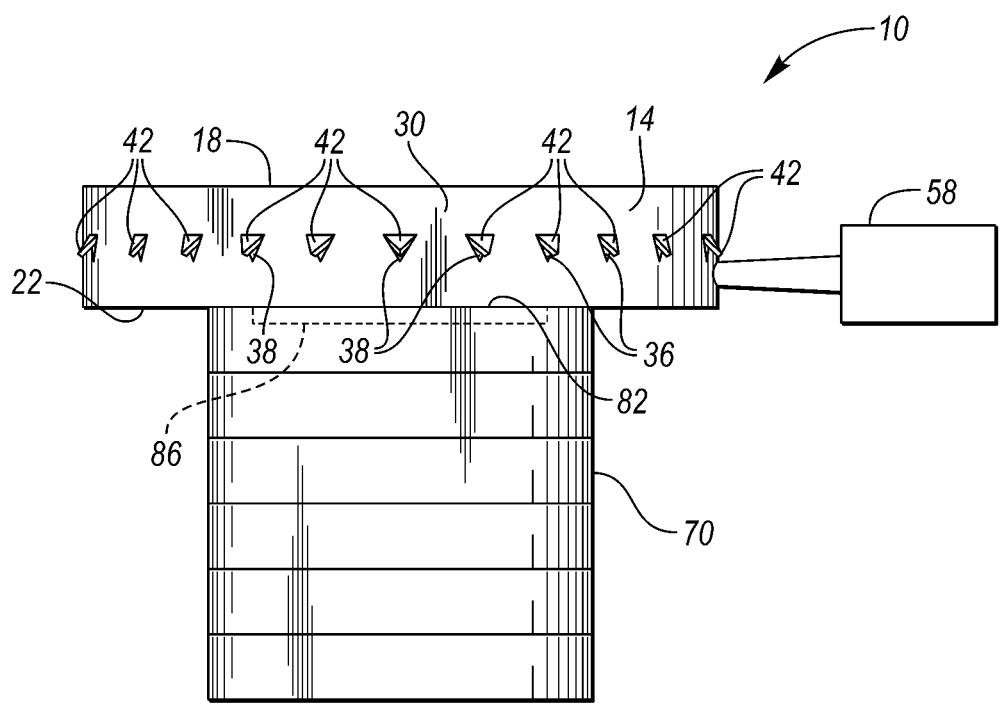
FIG. 4 is a schematic, side view of the heat distribution and airflow apparatus of FIG. 1 supported on the fire ring of FIG. 3.

The apparatus 10 is configured to efficiently distribute heat around a campfire. Referring to FIG. 3, a fire ring 70 is schematically depicted. The fire ring 70 shown is a generally hollow cylinder defining a cavity 74 with a circular opening 78 defined by the fire ring's upper surface 82. As understood by those skilled in the art, wood or other combustible material may be placed inside the cavity 74, and the fire ring 70 contains the resulting fire. The fire ring 70 may be comprised of steel, cement, stone, etc. The fire ring 70 functions as a support for the apparatus 10, as shown in FIG. 4. However, it should be noted that other supports for the apparatus may be employed within the scope of the claims, including but not limited to a base or support member that is integral with the apparatus 10 so that the apparatus 10 is self-supporting over a fire. A fire ring or other support structure may also be integrated with the apparatus 10 within the scope of the claims.

Figure 5:
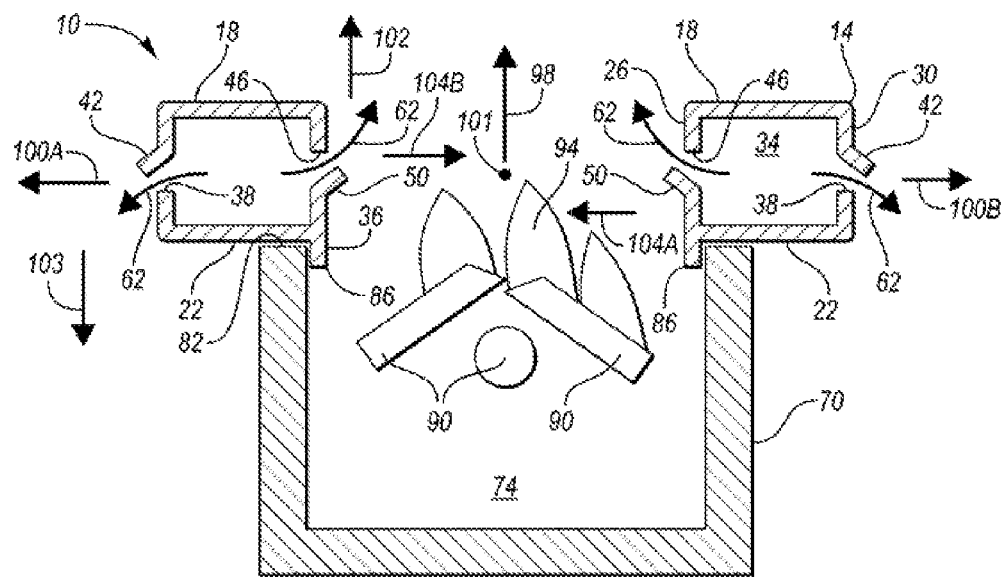
FIG. 5 is a schematic, cross-sectional side view of the heat distribution and airflow apparatus of FIG. 1 supported on the fire ring of FIG. 3.

More specifically, and with reference to FIGS. 4 and 5, wherein like reference numbers refer to like components from FIGS. 1-3, the apparatus 10 is positioned with respect to the fire ring 70 such that the lower wall portion 22 of the annular heat exchange member 14 contacts and is supported by the upper surface 82, and such that the axis of symmetry of the annular heat exchange member 14 is coextensive with the axis of the cylindrical cavity 74.

The annular heat exchange member 14 may include an annular lip 86 that extends into the cavity 74 and that has an outer diameter slightly less than the inner diameter of the fire ring 70, thereby limiting lateral movement of the apparatus 10 relative to the fire ring 70. FIG. 5 depicts the apparatus 10 in use with wood 90 combusting inside the cavity 74 to produce flames 94 and exhaust 98, which may include particulate matter, i.e., smoke.

The annular heat exchange member 14 is in heat transfer communication with the wood 90, flames 94, and exhaust 98, which flows upward through the circular hole 36 defined by the inner wall portion 26. The annular heat exchange member 14, which may, for example, comprise a metal such as steel, conducts heat from the fire, i.e., combusting wood 90, flames 94, and exhaust 98, to the air 62 inside the passageway 34, thereby increasing the temperature of the air 62 inside the passageway 34. When the fan or electric blower 58 is operating, the heated air 62 flows from the passageway 34 out of holes 38 and 46.

Heated air 62 exiting through holes 38 has a velocity component that is radially outward from the fire ring 70 and annular heat exchange member 14. Further, as shown in FIG. 5, each of the tabs 42 is positioned relative to a respective one of the holes 38 and angled relative to the heat exchange member 14 such that air 62 exiting holes 38 contacts the tabs 42 and the tabs 42 thereby impart a downward component to the velocity of the air 62. Accordingly, the apparatus 10 employs forced convection to transmit heat outward and downward toward humans near the fire.

Air 62 exiting through holes 46 has a velocity component that is radially inward relative to the annular heat exchange member 14 and the fire ring 70. Further, as shown in FIG. 5, the each of the tabs 50 is positioned relative to a respective one of the holes 46 and angled relative to the heat exchange member 14 such that air 62 exiting holes 46 contacts the tabs 50 and the tabs 42 thereby impart an upward component to the velocity of the air 62. Accordingly, air 62 exiting holes 46 flows upward and radially inward; this air 62 causes the exhaust 98, including smoke, to flow upward and inward relative to the member 14, thereby reducing or eliminating smoke from blowing on humans adjacent to the fire ring. Air exiting holes 46 may also create an area of low pressure inside the fire ring cavity 74, thereby producing a draft and improving combustion.

Thus, the apparatus 10 includes structure, i.e., heat exchange member 14, that defines a first plurality of holes 38 and a second plurality of holes 46 that provide fluid communication from the passageway 34 to the exterior of the apparatus 10. The apparatus 10 is configured such that air 62 exiting each of the first plurality of holes 38 includes a respective first velocity component 100A, 100B, each of the respective first velocity components being away from a point 101, which may, for example, be the center point of the annulus formed by the heat exchange member 14. The apparatus 10 is configured such that air 62 exiting the second plurality of holes 46 includes a second velocity component 102 that is perpendicular to each of the respective first velocity components 100A, 100B. The apparatus 10 is further configured such that air 62 exiting the first plurality of holes 38 includes a third velocity component 103 in the opposite direction than the second velocity component 102, and air 62 exiting the second plurality of holes 46 includes a respective fourth velocity component 104A, 104B that is toward the point 101. As understood by those skilled in the art, a "velocity component" refers to a component of the velocity vector.

When the apparatus 10 is properly positioned for use, components 100A, 100B, 104A, 104B are horizontal, component 102 is vertical (upward) and component 103 is vertical (downward). Vector components 100A, 100B are radially outward relative to the member 14, and vector components 104A, 104B are radially inward relative to the member 14.

The apparatus includes a plurality of outer deflectors, i.e., tabs 42. Each of the tabs 42 is positioned with respect to a respective one of the first plurality of holes 38 such that each of the tabs 42 imparts the third velocity component 103 on air 62 leaving the first plurality of holes 38. The apparatus includes a plurality of inner deflectors i.e., tabs 50. Each of the tabs 50 is positioned with respect to a respective one of the second plurality of holes 46 such that each of the tabs 50 imparts the second velocity component 102 on air 62 leaving the second plurality of holes 46.

In the embodiment depicts, tabs 42 are formed by bending a portion of the outer wall 30 during the process of forming holes 38. Similarly, tabs 50 are formed by bending a portion of the inner wall 26 during the process of forming holes 46. Thus, tabs 42 are bent portions of the outer wall 30, and tabs 50 are bent portions of the inner wall 26. However, it should be noted that tabs or deflectors may, within the scope of the invention, also be separate pieces that are mounted with respect to the apparatus. The tabs 42, 50 and holes 38, 46 are triangular in the embodiment depicted, but it should be noted that any shape may be employed within the scope of the claimed invention. Holes 38, 42 are coplanar with each other in the embodiment depicted, but may have other arrangements within the scope of the claimed invention. Holes 38, 42 are above the fuel, i.e., wood 90, in the embodiment depicted.

The fan or blower 58 may be powered by a battery, by connection to an electrical outlet, a portable generator, etc. Any other sources of power may be employed within the scope of the claims. In one embodiment, the apparatus 10 includes a thermoelectric generator 105 mounted with respect to the annular heat exchange member 14 to generate electrical energy using heat from the fire in the fire ring 70. The thermoelectric generator is in electrical communication with the electric fan or blower 58 via wires or other conductive material such that the fan or blower 58 is powered when the annular heat exchange member 14 is sufficiently heated.

Figure 6:
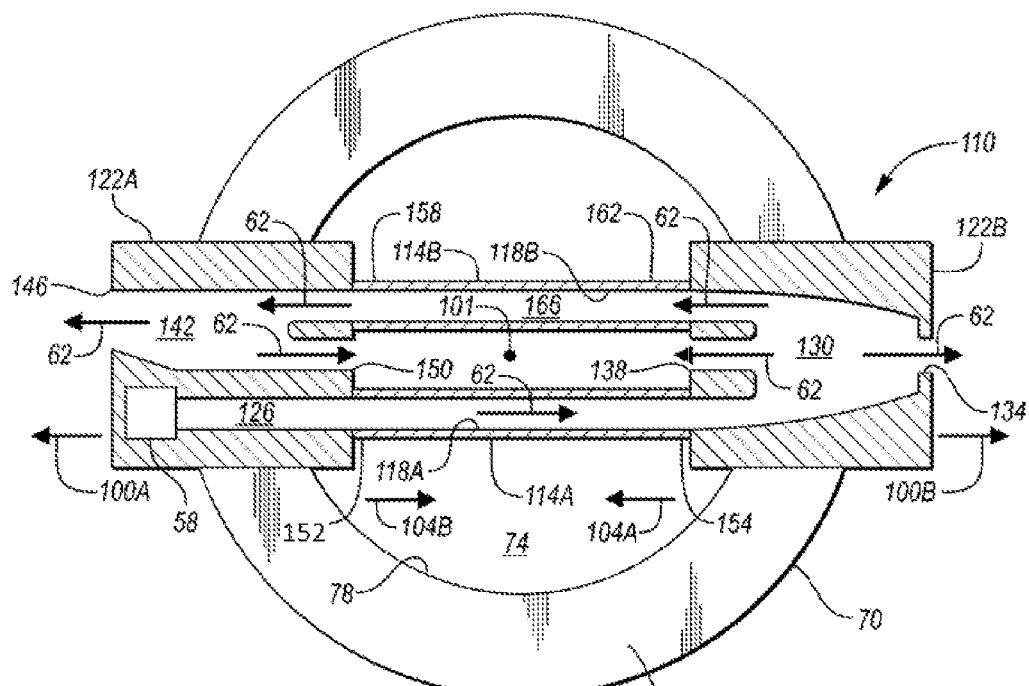
FIG. 6 is a schematic, top view of an alternative heat distribution and airflow apparatus.

Referring to FIG. 6, wherein like reference numbers refer to like components from FIGS. 1-5 an alternative embodiment is schematically depicted. In the alternative embodiment, apparatus 110 includes two cylindrical tubes 114A, 114B or other generally hollow member, each defining a respective passageway 118A, 118B. The tubes 114A, 144B depicted are linear, but may have other shapes within the scope of the claims. Tube 114A has respective first and second ends 152, 154; tube 114B has respective first and second ends 158, 162. The apparatus 110 also includes two support members, i.e., end members 122A, 122B, that are spaced apart from one another and that are mounted with respect to the tubes 114A, 114B at respective ends thereof. The end members 122A, 122B are spaced apart from one another such that they both rest on surface 82 of the fire ring 70 as shown, i.e., both end members 122A, 122B are situated on a diameter of the ring 70.

The apparatus 110 also includes fan or blower 58, which is mounted with respect to the end member 122A. End member 122A defines a passageway 126 that provides fluid communication from the fan 58 to passageway 118A of tube 114A. End member 122B defines passageway 130 that provides fluid communication from passageway 118A of tube 114A to passageway 118B of tube 114B. End member 122B also defines a hole 134 that provides fluid communication from the passageway 130 to the exterior of the apparatus 110, and a hole 138 that provides fluid communication from the passageway 130 the exterior of the apparatus 110.

End member 122A defines passageway 142, hole 146, and hole 150. Holes 146 and 150 provide fluid communication from passageway 142 to the exterior of the apparatus 110. Passageways 118A, 118B, 126, 130, 142 cooperate to define one large passageway 166.

In operation, the tubes 114A, 114B are in heat transfer communication with the fire in cavity 74, which heats air inside the passageways 118A, 118B. Fan 58 causes the air 62 to move through passageway 166. Air 62 is heated as it flows through passageway 118A of tube 114A. The air 62 will flow from passageway 118A into passageway 130; a portion of the air 62 will exit holes 134 and 138, and a portion of the air will travel from passageway 130 through passageway 118B, where it will again be heated, and then through holes 146 and 150 via passageway 142.

Holes 134 and 146 are positioned such that air exiting holes 134 and 146 are directed outward and away from the fire ring 70, similar to holes 38 in FIGS. 1-5. Tabs or other deflectors (not shown) similar to the tabs 42 in FIGS. 1-5 may impart a downward velocity component on air from holes 134 and 146. Holes 138 and 150 are positioned and configured such that air exiting holes 138 and 150 is directed upward (such as by tabs or other deflectors similar to those shown at 42 in FIGS. 1 and 5) and radially inward (relative to the fire ring 70), thereby functioning in a manner similar to holes 46 in FIGS. 1-5.

Thus, the apparatus 110 includes structure, i.e., end members 122A, 122B that define a first plurality of holes 134, 146 and a second plurality of holes 138, 150 that provide fluid communication from the passageway 166 to the exterior of the apparatus 110. The apparatus 110 is configured such that air 62 exiting each of the first plurality of holes 134, 146 includes a respective first velocity component 100A, 100B, each of the respective first velocity components being away from a point 101, which may, for example, be the center point of the fire ring 70 and equidistant from end members 122A, 122B. The apparatus 110 is configured such that air 62 exiting the second plurality of holes 138, 150 includes a second velocity component (as shown at 102 in FIG. 5) that is perpendicular to each of the respective first velocity components 100A, 100B. The apparatus 10 is further configured such that air 62 exiting the first plurality of holes 134, 146 includes a third velocity component (shown at 103 in FIG. 5) in the opposite direction than the first velocity component 102, and air 62 exiting the second plurality of holes 138, 150 includes a respective fourth velocity component 104A, 104B that is toward the point 101.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a heat exchange member at least partially defining a passageway;
structure defining a first plurality of holes and a second plurality of holes providing fluid communication from the passageway to the exterior of the apparatus;
a blower operatively connected to the heat exchange member and configured to blow air into the passageway;
wherein the apparatus is configured such that, when the heat exchange member is sufficiently positioned with respect to a campfire, air exiting the first plurality of holes is directed downward and away from the campfire and air exiting the second plurality of holes has an upward velocity component.

2. The apparatus of claim 1, wherein the heat exchange member and passageway form at least part of an annulus having an inner wall and an outer wall;
wherein the outer wall defines the first plurality of holes; and
wherein the inner wall defines the second plurality of holes.

3. The apparatus of claim 2, further comprising a plurality of outer deflectors, each of said outer deflectors being positioned with respect to a respective one of the first plurality of holes such that each of said outer deflectors imparts a downward velocity component on air leaving the first plurality of holes; and
a plurality of inner deflectors, each of said inner deflectors being positioned with respect to a respective one of the second plurality of holes such that each of the inner deflectors imparts an upward velocity component on air leaving the second plurality of holes.

4. The apparatus of claim 3, wherein each of the outer deflectors is formed by bending a portion of the outer wall portion; and
wherein each of the inner deflectors is formed by bending a portion of the inner wall portion.

5. The apparatus of claim 1, wherein the heat exchange member is a tube having first and second ends;
a first end member operatively connected to the first end of the tube and further defining the passageway, one of the first plurality of holes, and one of the second plurality of holes;
a second end member operatively connected to the second end of the tube and further defining the passageway, one of the first plurality of holes, and one of the second plurality of holes.

6. A method comprising:
providing an apparatus having heat exchange member defining a passageway, structure defining a first plurality of holes and a second plurality of holes that provide fluid communication from the passageway to the exterior of the apparatus, and a fan operatively connected to the heat exchange member and configured to blow air into the passageway;
placing the apparatus relative to a fire such that the heat exchange member is in heat transfer relationship with the fire;
causing air to flow through the passageway and out the first plurality of holes and the second plurality of holes;

wherein air exiting the first plurality of holes moves away from the fire and air exiting the second plurality of holes has an upward velocity component.

7. The method of claim 6, wherein the heat exchange member and passageway form at least part of an annulus having an inner wall and an outer wall;
   wherein the outer wall defines the first plurality of holes; and
   wherein the inner wall defines the second plurality of holes.

8. The method of claim 7, wherein the apparatus includes a plurality of outer deflectors, each of said outer deflectors being positioned with respect to a respective one of the first plurality of holes such that each of said outer deflectors imparts a downward velocity component on air leaving the first plurality of holes; and
   wherein the apparatus includes a plurality of inner deflectors, each of said inner deflectors being positioned with respect to a respective one of the second plurality of holes such that each of the inner deflectors imparts an upward velocity component on air leaving the second plurality of holes.

9. The method of claim 8, wherein each of the outer deflectors is formed by bending a portion of the outer wall portion; and
   wherein each of the inner deflectors is formed by bending a portion of the inner wall portion.

10. The method of claim 6, wherein the heat exchange member is a tube having first and second ends;
    wherein a first end member is operatively connected to the first end of the tube and further defines the passageway, one of the first plurality of holes, and one of the second plurality of holes; and
    wherein a second end member is operatively connected to the second end of the tube and further defines the passageway, one of the first plurality of holes, and one of the second plurality of holes.

11. An apparatus comprising:
    a heat exchange member at least partially defining a passageway;
    structure defining a first plurality of holes and a second plurality of holes providing fluid communication from the passageway to the exterior of the apparatus;
    a blower operatively connected to the heat exchange member and configured to blow air into the passageway;
    wherein the apparatus is configured such that air exiting the first plurality of holes includes a respective first velocity component that is away from a point; and
    wherein the apparatus is configured such that air exiting the second plurality of holes includes a second velocity component that is perpendicular to each of the respective first velocity components.

12. The apparatus of claim 11, wherein the apparatus is configured such that air exiting the first plurality of holes includes a third velocity in the opposite direction than the first velocity component.

13. The apparatus of claim 12, wherein the apparatus is configured such that air exiting the second plurality of holes includes a respective fourth velocity component that is toward the point.

14. The apparatus of claim 13, wherein the heat exchange member and passageway form at least part of an annulus having an inner wall and an outer wall;
    wherein the outer wall defines the first plurality of holes; and
    wherein the inner wall defines the second plurality of holes.

15. The apparatus of claim 14, further comprising a plurality of outer deflectors, each of said outer deflectors being positioned with respect to a respective one of the first plurality of holes such that each of said outer deflectors imparts the third velocity component on air leaving the first plurality of holes; and
    a plurality of inner deflectors, each of said inner deflectors being positioned with respect to a respective one of the second plurality of holes such that each of the inner deflectors imparts the second velocity component on air leaving the second plurality of holes.

16. The apparatus of claim 13, wherein the heat exchange member is at least one tube having first and second ends;
    a first end member operatively connected to the first end of the tube and further defining the passageway, one of the first plurality of holes, and one of the second plurality of holes;
    a second end member operatively connected to the second end of the tube and further defining the passageway, one of the first plurality of holes, and one of the second plurality of holes.

17. The apparatus of claim 15, wherein each of the outer deflectors is formed by bending a portion of the outer wall portion; and
    wherein each of the inner deflectors is formed by bending a portion of the inner wall portion.

* * * * *